United States Patent [19]

Huehn et al.

[11] Patent Number: 5,263,856
[45] Date of Patent: Nov. 23, 1993

[54] COMPOSITE FIFTH WHEEL BEARING PLATE

[76] Inventors: Stewart Huehn, 24 Park Ave. W., Elmira Ontario, Canada, N3B 1L2; Donald A. Fyfe, Box 121, Elmira Ontario, Canada, N3B 2Z5

[21] Appl. No.: 981,227

[22] Filed: Nov. 25, 1992

[51] Int. Cl.$^5$ .................. F16C 17/04; B62D 53/08
[52] U.S. Cl. .................................. 384/421; 280/433
[58] Field of Search .............. 384/297, 420, 421, 422, 384/909; 280/433

[56] References Cited

U.S. PATENT DOCUMENTS

| | | | |
|---|---|---|---|
| 3,337,277 | 8/1967 | Arnold | 384/421 |
| 3,704,924 | 12/1972 | Lowry | 384/421 |
| 3,924,909 | 12/1975 | Kent et al. | 384/421 |
| 4,121,853 | 10/1978 | McKay | 280/433 |
| 4,169,635 | 10/1979 | Szaley et al. | 384/421 |
| 4,542,912 | 9/1985 | St. Louis | 280/433 |
| 4,752,081 | 6/1988 | Reeners et al. | 384/421 X |
| 5,165,714 | 11/1992 | Kaim | 384/421 X |

*Primary Examiner*—Thomas R. Hannon
*Attorney, Agent, or Firm*—Jeffrey T. Imai; Arne I. Fors; D. Doak Horne

[57] ABSTRACT

A composite bearing plate for a fifth wheel comprises a steel base plate having a layer of polyurethane bonded thereto presenting a bearing surface. The base plate has a plurality of apertures communicating with a plurality of corresponding apertures in the polyurethane layer. The apertures present an opening for welding the bearing plate to the fifth wheel.

9 Claims, 2 Drawing Sheets

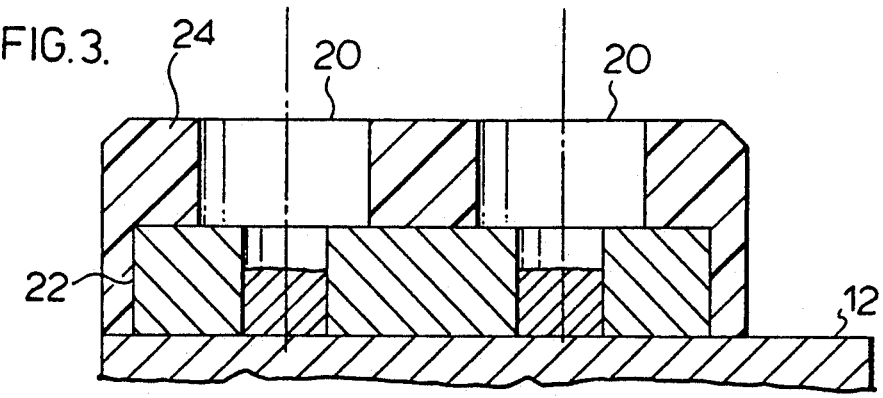
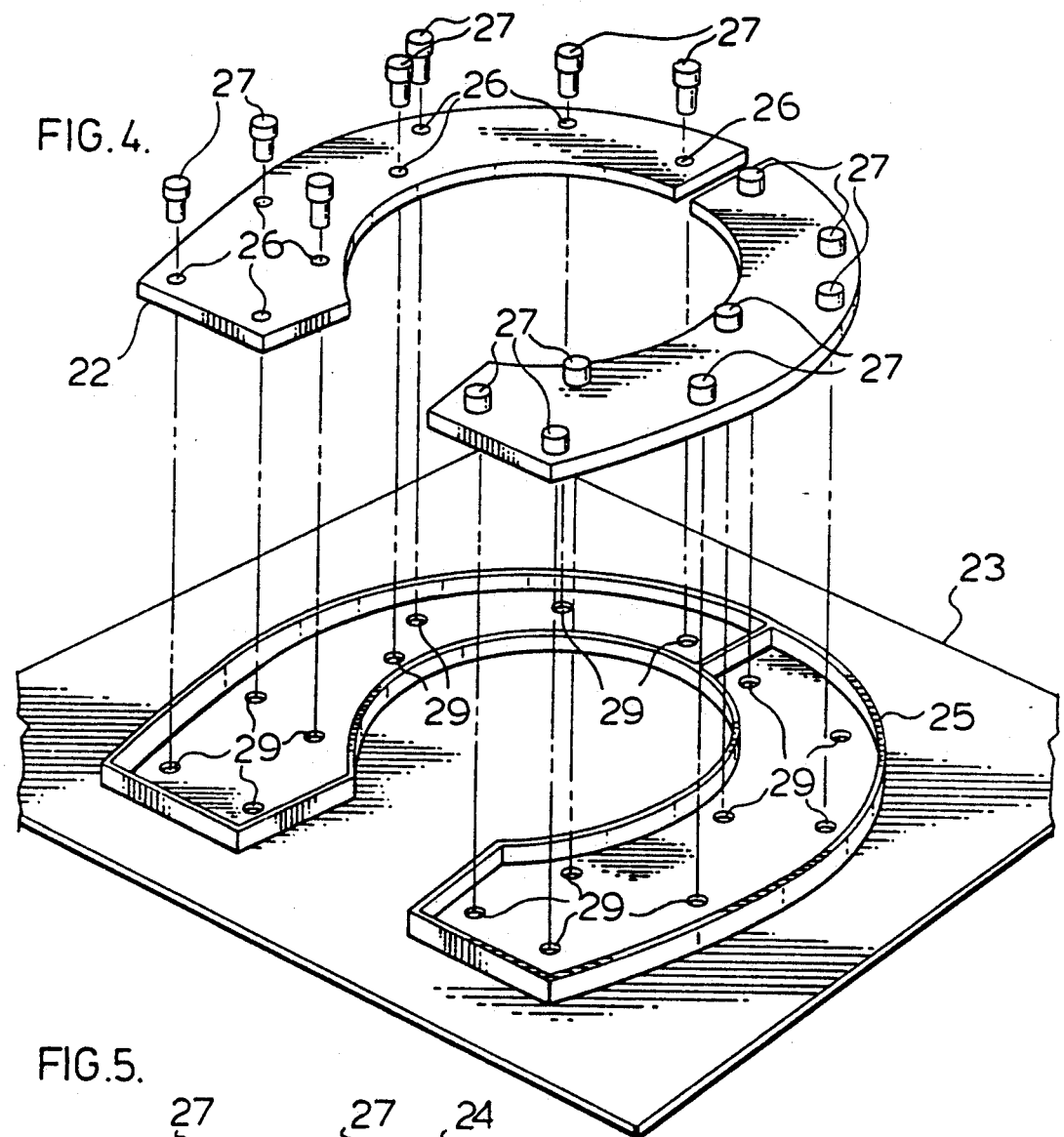
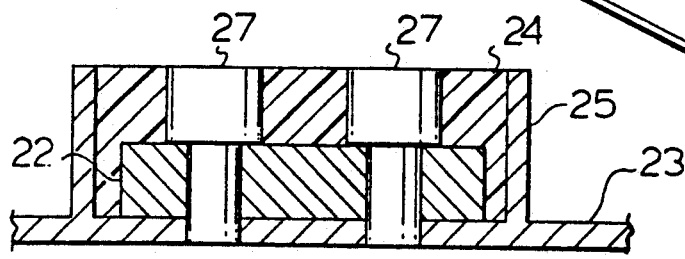

COMPOSITE FIFTH WHEEL BEARING PLATE

FIELD OF INVENTION

This invention relates to an attachment for a fifth wheel of a tractor-trailer vehicle. In particular, this invention relates to a plate of composite steel and plastic material secured over the fifth wheel.

BACKGROUND OF INVENTION

With the advent of high strength plastics having a low co-efficient to friction, plastic plates have been developed which cover the fifth wheel and act as a bearing surface between the trailer and the tractor. Such attachments have been disclosed in prior U.S. Pat. Nos. 3,337,277, 3,704,924, 3,924,909, 4,121,853, 4,542,912 and 4,169,635.

The prior art attachments described in these patents have proved to be beneficial in reducing the maintenance of the fifth wheel by reducing the need for greasing the fifth wheel. However, the prior art devices are generally bolted, riveted onto the fifth wheel using countersunk screws. Such attachments have improved the life of the fifth wheel. However, the method of attachment has proved to be unsatisfactory as the plate becomes damaged after prolonged use due to increased movement between the plate and the fifth wheel as a result of the screws becoming worn and the heads of the screws being sheared.

Still other attachments have used a rivet having an axial bore. The rivet is placed in a counter-sunk bore in the face of the plastic plate and then welded to the fifth wheel. Such method of attachment has also proved unsatisfactory as the rivets become dislodged after prolonged use.

SUMMARY OF THE INVENTION

The disadvantages of the prior art may be overcome by providing a composite cover plate of a plastic low friction material having an integrally moulded steel base plate which may be welded directly onto the fifth wheel for securement therebetween.

According to one aspect of the invention, there is provided a bearing plate for a fifth wheel comprising a steel base plate having a layer of polyurethane bonded thereto presenting a bearing surface. The base plate has a plurality of apertures communicating with a plurality of corresponding apertures in the polyurethane layer. The apertures present an opening for welding the bearing plate to said fifth wheel.

The base plate is sandblasted and cleaned prior to bonding the polyurethane layer thereto. A bonding agent is applied to the base plate for enhancing the bond between the base plate and the polyurethane layer. The base plate is coated with at least two coats of said bonding agent and baked in an oven at 115° C. for a minimum of 1 hour. The base plate is heated to at least 115° C. and a resin for the polyurethane layer is pre-heated to at least 115° C. before the addition of a compatible curative for hardening the resin and then the polyurethane layer is moulded about the base plate.

According to another aspect of the invention, there is provided a method of making a composite bearing plate wherein the method comprises the following steps:

cutting and finishing a steel plate to the desired shape;
sandblasting and cleaning said steel plate;
boring a plurality of apertures through said base plate in a predetermined pattern;
applying a first coating of a bonding agent for enhancing the bond between the base plate and said polyurethane layer and allowing said first coating to dry;
applying a second coating of a bonding agent and allowing said second layer to dry;
inserting plugs in said bores for forming a plurality of apertures in the polyurethane layer;
heating said base plate to a predetermined temperature;
pre-heating a resin for the polyurethane layer to said predetermined temperature;
adding a compatible curative for hardening said resin;
moulding said polyurethane layer over said base plate; and
removing said plugs presenting a plurality of apertures in the face of said bearing plate.

DETAILED DESCRIPTION OF THE DRAWINGS

In drawings which illustrate embodiments of the invention,

FIG. 3 is a sectional view of one arm of the embodiment of FIG. 1 across the line III—III;

FIG. 4 is an exploded perspective view of the mould for manufacturing the invention of FIG. 1; and FIG. 5 is a cross-sectional view of the mould with the of FIG. 4.

DESCRIPTION OF THE PREFERRED EMBODIMENT

Figure 2:
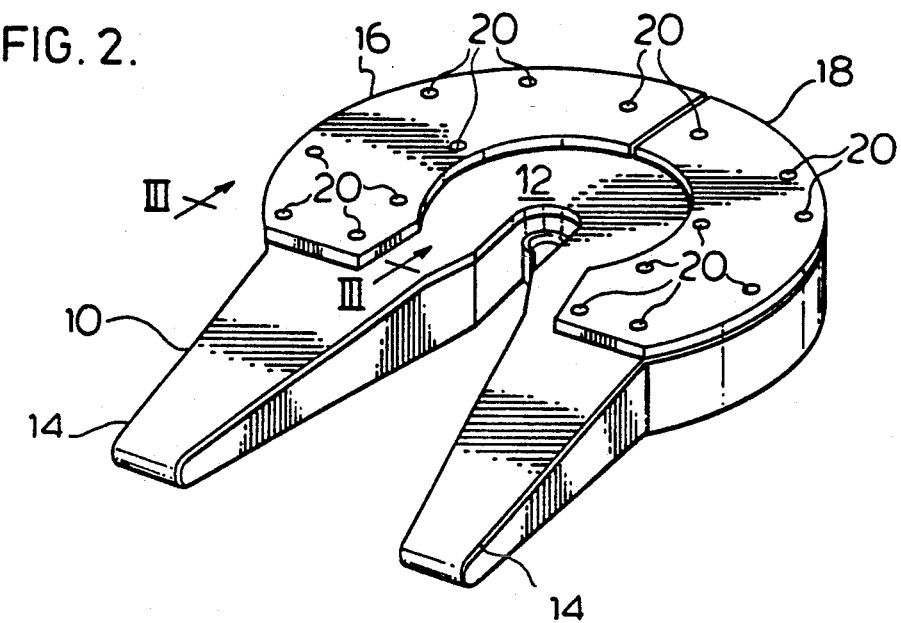
FIG. 2 is a perspective view of the embodiment of FIG. 1.
Figure 1:
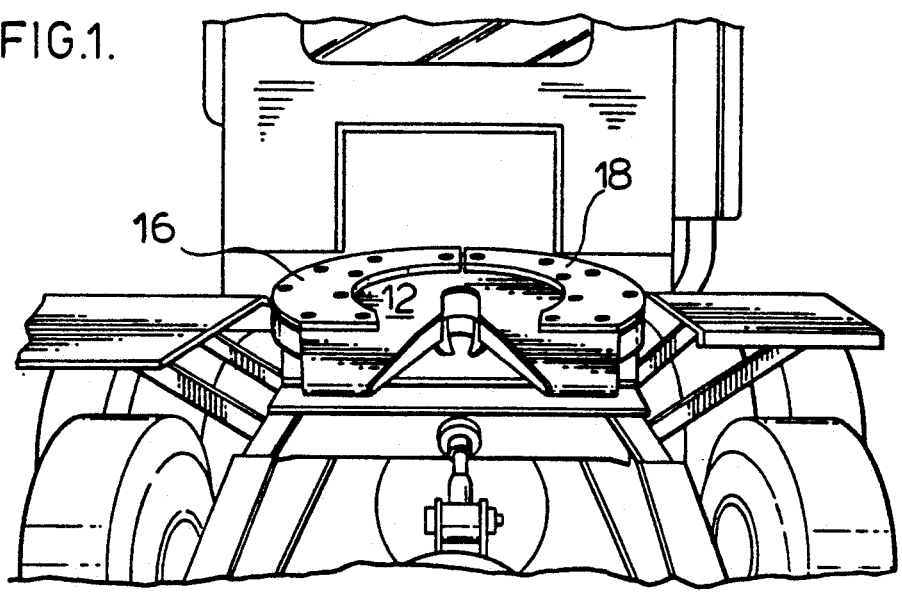
FIG. 1 is a perspective view of the present invention welded onto a fifth wheel of a tractor-trailer.

Referring to FIG. 1, there is illustrated a fifth wheel 10 having a conventional semicircular configuration with a substantially flat bearing plate 12, with a pair of spaced parallel guides 14 extending outwardly and downwardly from the surface plane of the composite bearing plate 12.

The composite bearing plate of the present invention comprises a left hand arcuate plate 16 and a right hand arcuate plate 18. On the upper surface of plate 16 and 18 are a plurality of circular openings 20 on the upper surface thereof. The formation of these openings will be discussed below.

Referring to FIG. 3, plate 16 has a plate 22 surrounded by plastic material 24. Plate 22 has a shape substantially similar to the outline or contours of plate 16 and having a plurality of bores 26 extending therethrough in a pattern substantially similar to the pattern of openings 20.

Preferably, plate 22 is a steel plate surrounded by a polyurethane layer 24. Since the base of plate 20 is steel, it can be mig welded directly to the bearing surface 12 at each of the openings 20. The plate 16 can be firmly and securely affixed to the bearing surface.

Plate 18 is identical to plate 16 except that it is contoured as a left hand arcuate configuration. Once installed in an end to end relation, plate 16 and 18 form a U shaped or horse shoe shape surface over top of the bearing surface 12 presenting a bearing surface having low frictional properties.

To manufacture a plate of the present invention, the steel plates are cut and finished to the desired configuration. Although the embodiments illustrate plate 16 and 18 as two separate pieces, it is apparent that a single steel base plate could be used. The plate is trimmed and edge finished in a suitable manner.

The upper and side edges of the steel plate 22 is sand blasted using an aluminum oxide. A lacquer thinner is then used to clean the steel surfaces. A first coat of a bonding agent, is applied to the surface and edges of the plate 22. The first coat is allowed to completely dry before a second coat is applied. The base plate is then baked in an oven at 115° C. for a minimum of 1 hour to allow the bonding agent to harden. In the preferred embodiment, the bonding agent used is toluene diisocyanate available under the trademark AD-1146-C-1.

In the preferred embodiment, an aluminum mould is used having a base plate 23. Extending upwardly from the base is a bead 25 which will form the sides of plate 16 or 18. Bead 25 will have a configuration complimentary to plates 16 and plate 18.

The treated steel plate is then placed centrally in the mould. Plugs 27 having a first diameter substantially equal to the diameter of the bores 26 of steel plate 22 and an opposite end having a diameter equal to the diameter of the holes 20 are inserted into each bore 26. Plugs 27 extend beyond the surface of plate 22 to mate with recesses 29 in the face of base plate 23 of the mould. The plugs 27 position the plates 22 during the moulding process. The mould together with the steel plate 22 and plugs, are placed in a baking oven and baked for approximately 1 hour at a predetermined temperature of 115° C.

The polyurethane resin is preheated to a predetermined temperature of 115° C. Once the resin has been preheated to a 115° C., a curative is mixed with the resin and poured into the mould. The resin will harden in approximately 90 seconds. The mould and resin is heated to 120° C. for approximately 16 hours to cure the resin. Once the resin has cured, the finished plate 16 can be removed from the mould and then the plugs can be removed presenting apertures 20 in the surface of the plate 16.

In the preferred embodiment, the resin which is used is a liquid urethane elastomer and available under the trade-mark ADIPRENE L275 and the corresponding curative under the trade-mark E3Q0, both available from the Uniroyal Chemical Company. The predetermined temperature depends upon the resin and curative selected. Other manufactures of resin may be substituted. Each resin will have different curing characteristics for the optimum bonding properties with steel. The heating time and temperature will vary depending on the type of resin used. The manufacturer of the resin should be consulted before a particular resin is selected.

Once the plate 16 has cooled, it is ready to be mig welded directly to the fifth wheel. Although it is preferred to mig weld the composite plate onto the fifth wheel, other suitable methods of welding may also be used to achieve satisfactory results.

Although the preferred embodiment of the present invention has been illustrated and described, it will be apparent to those skilled in the art that various changes and modification may be made without departing from the spirit and scope of the invention.

I claim:

1. A composite bearing plate for a fifth wheel comprising a steel base plate having a layer of polyurethane bonded thereto presenting a bearing surface, said base plate having a plurality of apertures communicating with a plurality of corresponding apertures in the polyurethane layer, said apertures presenting an opening for welding said bearing plate to said fifth wheel.

2. A composite bearing plate as claimed in claim 1 wherein said base plate is sandblasted and cleaned prior to bonding said polyurethane layer thereto.

3. A composite bearing plate as claimed in claim 2 wherein a bonding agent is applied to said base plate for enhancing the bond between the base plate and said polyurethane layer.

4. A composite bearing plate as claimed in claim 3 wherein said base plate is coated with at least two coats of said bonding agent.

5. A composite bearing plate as claimed in claim 4 wherein said base plate is heated to a predetermined temperature, a resin for the polyurethane layer is preheated to said predetermined temperature before the addition of a compatible curative for hardening said resin and said polyurethane layer is moulded about said base plate.

6. A composite bearing plate as claimed in claim 5 wherein said predetermined temperature is 115° C.

7. A composite bearing plate as claimed in claim 5 wherein said bonding agent is toluene diisocyanate.

8. A composite bearing plate as claimed in claim 5 wherein said bearing plate is substantially U-shaped.

9. A composite bearing plate as claimed in claim 5 wherein said bearing plate comprises a left hand plate and a right hand plate abutted end to end in a substantially U shape.

* * * * *